United States Patent
Hegde et al.

(10) Patent No.: US 9,154,615 B1
(45) Date of Patent: Oct. 6, 2015

(54) CONTEXT PROFILE IDENTIFICATION AND SHARING

(71) Applicant: Verizon Patent and Licensing Inc., Arlington, VA (US)

(72) Inventors: Mayuresh Mohan Hegde, Coppell, TX (US); Nitin Ahuja, Irving, TX (US); Vincent Lally, White Plains, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/263,658

(22) Filed: Apr. 28, 2014

(51) Int. Cl.
*H04M 1/56* (2006.01)
*H04M 15/06* (2006.01)
*H04M 3/42* (2006.01)
*G06Q 30/00* (2012.01)

(52) U.S. Cl.
CPC ......... *H04M 3/42042* (2013.01); *G06Q 30/016* (2013.01); *H04M 3/42348* (2013.01)

(58) Field of Classification Search
CPC ..... H04L 63/08; H04L 63/102; H04M 15/00; G06F 21/10; G06F 2221/0775; G06F 17/30864; G06F 17/30861; G06F 15/16; G06F 17/30702; G06F 17/30; G06Q 20/02; G06Q 30/02; G06Q 30/30861

USPC .................. 379/93.17, 93.23, 142.01, 142.1, 379/142.17, 265.01, 265.09, 265.13, 266.1, 379/268, 280; 370/352, 357, 360; 709/213, 709/223, 225, 226, 229
See application file for complete search history.

(56) References Cited

U.S. PATENT DOCUMENTS

| | | | | |
|---|---|---|---|---|
| 5,964,839 A * | 10/1999 | Johnson et al. | ............... | 709/224 |
| 6,909,708 B1 * | 6/2005 | Krishnaswamy et al. | .... | 370/352 |
| 8,909,925 B2 * | 12/2014 | Baskaran | ....................... | 713/165 |
| 2012/0246065 A1 * | 9/2012 | Yarvis et al. | ..................... | 705/39 |
| 2013/0060866 A1 * | 3/2013 | Davis et al. | .................... | 709/206 |
| 2014/0032597 A1 * | 1/2014 | Ellis et al. | ..................... | 707/770 |
| 2015/0006529 A1 * | 1/2015 | Kneen et al. | .................. | 707/736 |

* cited by examiner

*Primary Examiner* — Binh Tieu (57) ABSTRACT

A server device may receive, from a user device, application activity data associated with the user device; determine, based on the application activity data, a location associated with the user device; store information associating the application activity data with a call identifier and the location; receive an indication that an incoming call has been received, the incoming call being placed using the call identifier; determine, based on receiving the indication, a location of a caller that placed the call; identify the application activity data based on the call identifier and the location of the caller; and output the application activity data to a callee associated with the call.

20 Claims, 8 Drawing Sheets

CONTEXT PROFILE IDENTIFICATION AND SHARING

BACKGROUND

When a user contacts a customer service provider, associated with a particular application, the customer service provider may attempt to assist the user (e.g., resolve technical issues, place an order for goods and/or services, etc.). The customer service provider may be unaware of the user's interaction with the application prior to when the user contacts the customer service provider.

DETAILED DESCRIPTION OF THE PREFERRED EMBODIMENTS

The following detailed description refers to the accompanying drawings. The same reference numbers in different drawings may identify the same or similar elements.

When a user contacts a customer service provider, associated with a particular application, the customer service provider may be unaware of the user's application activity data. As used herein, the term "application activity data" may refer to a user's interactions with an application, a user's browsing activity among a group of web pages (herein after referred to as "pages"), a user's interaction within particular pages (e.g., selections of scripts within pages), etc. Knowledge of the user's application activity data may permit the customer service provider to better assist the user when the user contacts the customer service provider. For example, knowledge of the user's application activity data may permit the customer service provider to better assist the user resolve technical issues, place an order for goods and/or services, etc.

Systems and/or methods, as described herein, may generate a context profile for a user, and associate an identifier (e.g., a telephone number) with the user's context profile. When the user contacts the customer service provider by placing a call to the telephone number, the customer service provider may receive the user's context profile. The context profile may include information identifying the user's application activity data, and/or some other information regarding a reason for the user's call to the customer service provider. Information in the context profile may be used to display (e.g., in a graphical user interface) the user's application activity data, such as the user's inputs (e.g., the user's interactions with a page and/or application). Since the customer service provider may receive the user's context profile, the customer service provider may be able to better assist the user in relation to when the customer service provider does not receive the user's context profile.

In some implementations, the systems and/or methods may associate multiple context profiles with a particular telephone number. Each of the multiple context profiles may be associated with a particular geographic location (hereinafter referred to as a "location"). For example, when generating the context profile, the location associated with the context profile may be identified (e.g., based on an internet protocol ("IP") address of a user device associated with the application activity data). When a call is placed to the particular telephone number, a particular context profile may be identified based on the location of the caller and based on the particular telephone number called.

Figure 1:
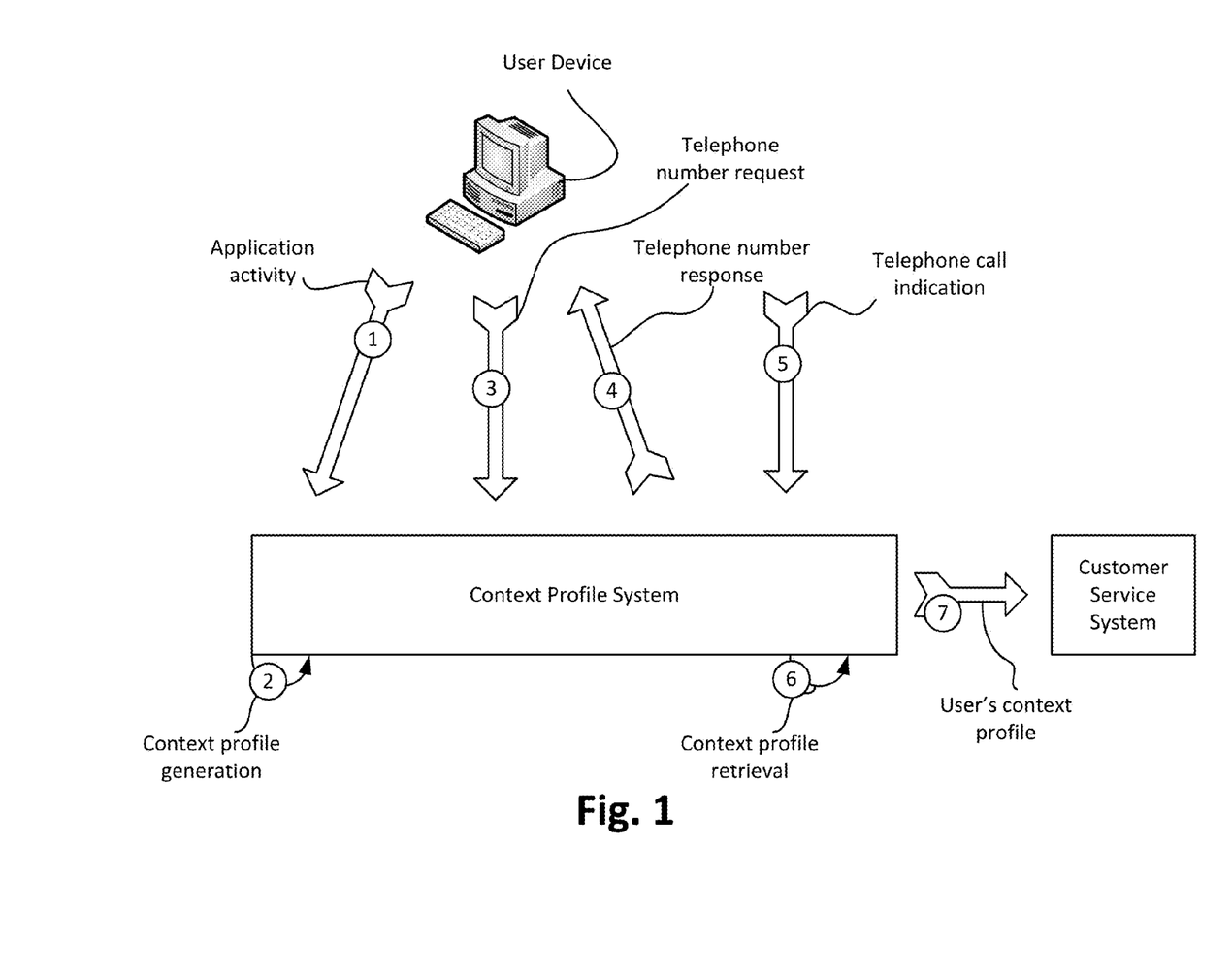
FIG. 1 illustrates an example overview of an implementation described herein.

FIG. 1 illustrates an example overview of an implementation described herein. As shown in FIG. 1, a user device may provide application activity data to a context profile system (arrow 1). The application activity data may include metadata and/or some other type of data that identifies pages visited by a user of the user device (e.g., pages associated with a customer service provider), the user's interactions with the pages, contents of the user's shopping cart, the user's interactions with an application associated with the customer service provider, and/or other activity data.

A context profile system may receive the application activity data, and may generate a context profile for the user (arrow 2). As the user continues to interact with pages and/or applications, the context profile system may monitor the application activity, and store the user's application activity data information in the context profile. The context profile system may also store information associating the user's context profile with a location. In some implementations, the location may be determined based on the IP address. Additionally, or alternatively, the location may be determined based on some other technique.

The context profile system may receive a telephone number request (3) (e.g., when the user requests the telephone number in order to contact the customer service provider). Based on receiving the telephone number request, the context profile system may select a telephone number, in a group of available telephone numbers, and provide a particular available telephone number (arrow 4). The context profile system may also associate the telephone number with the user's context profile.

After providing the telephone number, the context profile system may receive an indication of a telephone call (arrow 5). The call may be placed by the user device and/or by another device. For example, the context profile system may receive the indication of the telephone call when a call is placed to the telephone number provided by the context profile system. Based on receiving the telephone call indication, the context profile system may identify the particular context profile associated with the telephone number (arrow 6), and provide the context profile to a customer service system associated with the customer service provider (arrow 7). Based on receiving the user's context profile, an operator, associated with the customer service system, may review the user's context profile to better assist the user than if the operator did not receive the user's context profile.

Figure 2:
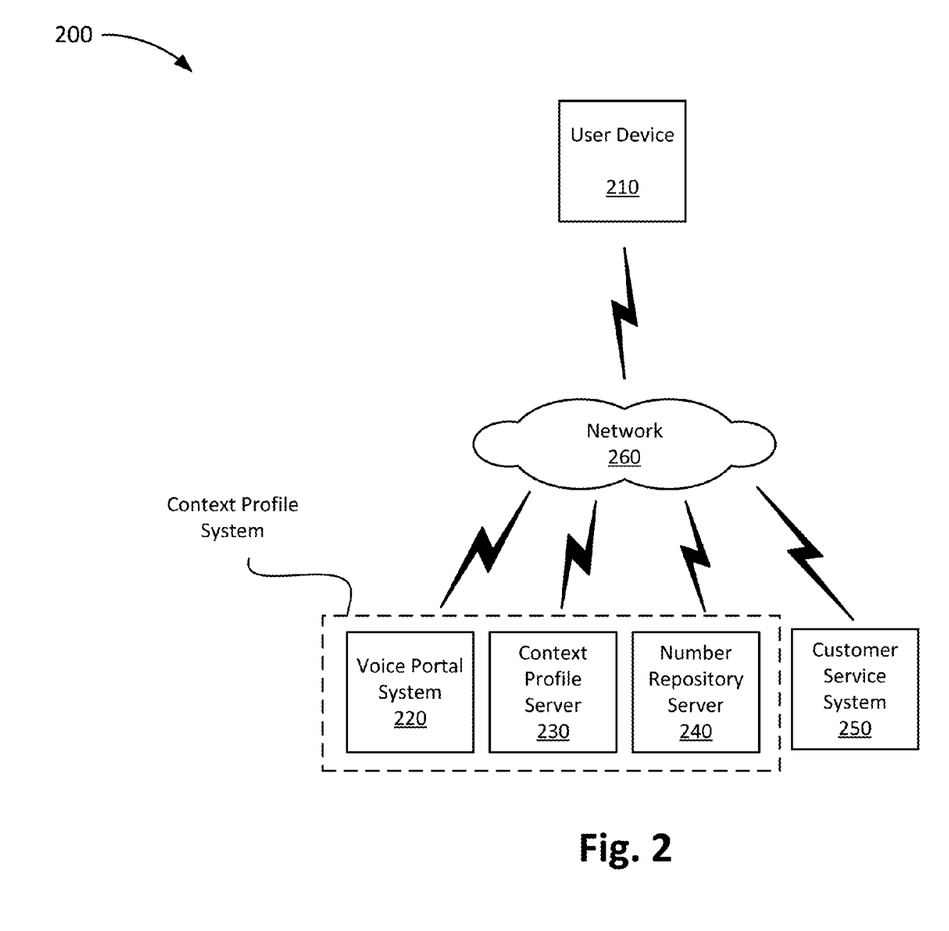
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, voice portal system 220, context profile server 230, number repository server 240, customer service system 250, and network 260. In some implementations, voice portal system 220, context profile server 230, and number repository server 240 may be part of a context profile system. The context profile system and customer service system 250 may be associated with a customer service provider.

User device 210 may include a device capable of communicating via a network, such as network 260. For example, user device 210 may correspond to a mobile communication device (e.g., a smart phone or a personal digital assistant ("PDA")), a portable computer device (e.g., a laptop or a tablet computer), a gaming device, a set-top box, a desktop computer device, and/or another type of device. In some implementations, a user of user device 210 may interact with an application and/or a group of pages, associated with a customer service provider. For example, user device 210 may communicate with an application or web server as the user interacts with the application and/or group of pages. User device 210 may provide, to context profile server 230, application activity data (e.g., information regarding the user's interactions with an application, the user's browsing activity among a group of pages the user's interaction within particular pages, etc.). User device 210 may be used to request a telephone number from context profile server 230 and/or number repository server 240 (e.g., to be used to contact a customer service provider associated with the application and/or group of pages).

Voice portal system 220 may include one or more computing devices, such as a server device or a collection of server devices. In some implementations, voice portal system 220 may receive a telephone call from a user when the user places a call to customer service provider (e.g., using a telephone number provided by context profile server 230 and/or number repository server 240). Voice portal system 220 and may gather information identifying the purpose of the user's call. For example, voice portal system 220 may receive the information identifying the purpose of the user's call via voice recognition techniques, touch-tone feedback techniques, and/ or via some other technique. In some implementations, voice portal system 220 may provide the received information (referred herein as "voice portal data") to context profile server 230. The voice portal data may also include information identifying the telephone number that the user dialed to contact the customer service provider. The voice portal data may further include the user's telephone number (e.g., via a caller ID technique and/or some other technique). In some implementations, voice portal system 220 may forward the telephone call to customer service system 250, associated with the customer service provider, once the voice portal data has been gathered and provided to context profile server 230.

Context profile server 230 may include one or more computing devices, such as a server device or a collection of server devices. In some implementations, context profile server 230 may monitor application activity data associated with user device 210, and may maintain a context profile based on the application activity data. Context profile server 230 may maintain multiple context profiles for corresponding users. In some implementations, context profile server 230 may receive a request for a telephone number, and may provide the request to number repository server 240. Context profile server 230 may then provide the telephone number to user device 210, or direct number repository server 240 to provide the telephone number. Context profile server 230 may associate the telephone number with a context profile associated with a user that requested the telephone number.

Context profile server 230 may receive an indication of a telephone call to the provided telephone number, and may identify a context profile associated with the telephone number. In some implementations, context profile server 230 may receive the indication of the telephone call as part of voice portal data from voice portal system 220. Alternatively, context profile server 230 may receive the indication without involving voice portal system 220. In some implementations, context profile server 230 may store the voice portal data as part of the context profile. Context profile server 230 may provide the context profile to customer service system 250 based on identifying the context profile associated with the telephone number identified in the indication and/or voice portal data. In some implementations, context profile server 230 may determine that a telephone number has expired, and may provide an indication, to number repository server 240, that the telephone number has expired (e.g., so that the telephone number may be made available for reuse). Context profile server 230 may also remove an association between the expired telephone number and the context profile.

Number repository server 240 may include one or more computing devices, such as a server device or a collection of server devices. Number repository server 240 may store a list of telephone numbers that may be used to contact a customer service provider. In some implementations, number repository server 240 may store multiple lists of telephone numbers. Each list of telephone numbers may be associated with a particular geographic location or region. The quantity of telephone numbers in the list of telephone numbers for one region may be equal to or different than the quantity of telephone numbers in the list of telephone numbers for another region (e.g., to accommodate regions of different sizes). In some implementations, a list of telephone numbers may be associated with a particular group of users. For example, a particular group of users may be associated with a particular list of telephone numbers that may be reserved for use by members of that group.

Number repository server 240 may maintain information identifying whether a telephone number is already in use (e.g., numbers that have already been provided and/or associated with a context profile). For example, number repository server 240 may store information identifying that a telephone number is in use when number repository server 240 provides the telephone number in response to a request for the telephone number. Number repository server 240 may store information identifying that the telephone number is available when context profile server 230 provides an indication that the telephone number has expired. In some implementations, number repository server 240 may provide a telephone number that is already in use when no available telephone numbers exist. As described above, context profile server 230 may associate multiple context profiles with a particular telephone number, and identify a particular context profile based on a location associated with the particular text profile and a location identified by an area code of a calling party.

Customer service system 250 may include one or more computing devices, such as a server device or a collection of server devices. In some implementations, customer service system 250 may receive a context profile from context profile server 230. For example, customer service system 250 may receive a context profile associated with a telephone number used to contact a customer service provider associated with customer service system 250. An operator of customer service system 250 may receive the context profile and may assist the user (e.g., via the telephone call) based on information included in the context profile.

Network 260 may include one or more wired and/or wireless networks. For example, network 260 may include a cellular network (e.g., a second generation ("2G") network, a third generation ("3G") network, a fourth generation ("4G") network, a fifth generation ("5G") network, a long-term evolution ("LTE") network, a global system for mobile ("GSM") network, a code division multiple access ("CDMA") network, an evolution-data optimized ("EVDO") network, or the like), a public land mobile network ("PLMN"), and/or another network. Additionally, or alternatively, network 260 may include a local area network ("LAN"), a wide area network ("WAN"), a metropolitan network ("MAN"), the Public Switched Telephone Network ("PSTN"), an ad hoc network, a managed IP network, a virtual private network ("VPN"), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
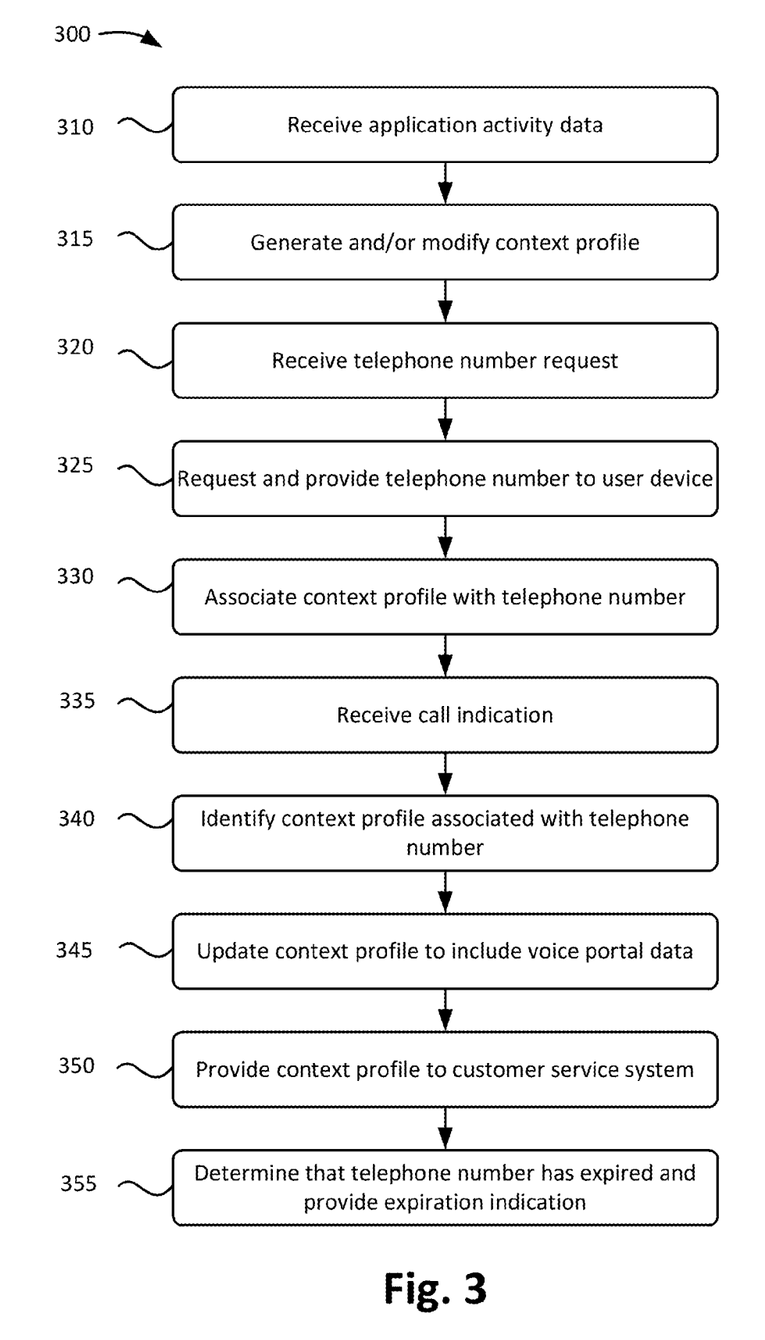
FIG. 3 illustrates a flowchart of an example process for providing a context profile to a customer service system.

FIG. 3 illustrates a flowchart of an example process 300 for providing a context profile to a customer service system. In some implementations, process 300 may be performed by context profile server 230. In some implementations, some or all of blocks of process 300 may be performed by one or more other devices.

As shown in FIG. 3, process 300 may include receiving application activity data (block 310). For example, context profile server 230 may receive application activity data from user device 210 as a user of user device 210 interacts with pages and/or applications associated with a customer service provider. The application activity data may also uniquely identify the user (e.g., based on an IP address via which user device 210 communicates, login information provided by the user when interacting with the pages, etc.). Context profile server 230 may continuously monitor the application activity by periodically or intermittently receiving application activity data.

Process 300 may also include generating and/or modifying a context profile (block 315). For example, context profile server 230 may generate a context profile for the user, or modify an existing context profile if a context profile already exists for the user. The context profile may store information regarding the user's application activity data. Context profile server 230 may continuously update the context profile as context profile server 230 periodically or intermittently receives application activity data. In some implementations, context profile server 230 may associate location information with the context profile. In some implementations, the location may be determined based on the IP address. Additionally, or alternatively, the location may be determined based on some other technique.

Process 300 may further include receiving a telephone number request (block 320). For example, context profile server 230 may receive the telephone number request from user device 210 when the user requests the telephone number in order to contact the customer service provider. In some implementations, the user may request the telephone number via a page and/or an application that may present an option for the user to request the telephone number. For example, the page and/or application may present a button that, when selected by the user, may cause user device 210 to provide the telephone number request.

Process 300 may also include requesting and providing the telephone number to the user device (block 325). For example, context profile server 230 may request the telephone number from number repository server 240. In some implementations, the request for the telephone number may include information identifying the user, and/or information identifying a location of user device 210 (e.g., an IP address, user profile information, etc.). Based on receiving the request, number repository server 240 may provide a telephone number.

In some implementations, number repository server 240 may provide a particular telephone number out of a group of telephone numbers associated with the identified location and/or with the user. For example, as described above, number repository server 240 may store multiple lists of telephone numbers, and each list may be associated with a particular region or a particular group of users. Number repository server 240 may select a particular telephone number from a particular list of telephone numbers associated with the identified location or with the user. In some implementations, number repository server 240 may select a telephone number, regardless of the location or the user identified in the telephone number request.

As described above, number repository server 240 may maintain information identifying whether a telephone number is already in use (e.g., have already been provided and/or associated with a context profile). Number repository server 240 may select a telephone number that is not in use and provide the selected telephone number. In some implementations, number repository server 240 may select a telephone number that is already in use if a telephone number that is not in use is not available. In some implementations, context profile server 230 may receive the selected telephone number, and provide the selected telephone number to user device 210.

Process 300 may also include associating the context profile with the telephone number (block 330). For example, context profile server 230 may associate the context profile with the telephone number by storing information (e.g., in a data structure) that indicates that the context profile is associated with the telephone number.

Process 300 may further include receiving a call indication (block 335). For example, context profile server 230 may receive the call indication when the user places a telephone call to the customer service provider using the telephone number provided to user device 210. The call indication may identify the telephone number used to place the telephone call to the customer service provider. In some implementations, context profile server 230 may receive the call indication as part of voice portal data. For example, when the user places the telephone call, voice portal system 220 may answer the telephone call and gather information identifying the purpose of 7the user's call. Voice portal system 220 may provide the gathered information (e.g., voice portal data including the call indication) to context profile server 230. In some implementations, context profile server 230 may receive the call indication without involving voice portal system 220. For example, in an implementation where voice portal system 220 is not present, context profile server 230 may receive the call indication from a call server or from other server or system when the user places the telephone call to the customer service provider.

Process 300 may also include identifying the context profile associated with the telephone number (block 340). For example, context profile server 230 may identify the context profile associated with the telephone number associated the call indication. In some implementations, context profile server 230 may look up the telephone number in a data structure that identifies telephone numbers associated with context profiles. As described in greater detail below with respect to FIG. 4, context profile server 230 may identify a particular context profile if multiple context profiles are associated with the telephone number.

Process 300 may further include updating the context provide to include voice portal data (block 345). For example, context profile server 230 may update the context profile if context profile server 230 receives voice portal data from voice portal system 220, as described above. In some implementations, context profile server 230 may update the context profile to include information regarding the purpose for the user's call, as identified by the voice portal data.

Process 300 may also include providing the context profile to a customer service system (block 350). For example, context profile server 230 may provide the context profile to customer service system 250. Once customer service system 250 receives the context profile, an operator of customer service system 250 may assist the user (e.g., via the telephone call) based on information included in the context profile. As an example the operator of customer service system 250 may assist the user perform a task using an application or service associated with the customer service provider. Based on information included in the context profile, the operator may identify the user's intentions to better assist the user (e.g., in relation to when the context profile is not received). Further, the operator may identify actions the user has taken based on information in the context profile so that these actions may not be redundantly performed. Further, the operator may be better prepared to assist the user and may have a better understanding of how to assist the user based on information included in the context profile (e.g., in relation to when the context profile is not received). In some implementations, context profile server 230 may discard the context profile once provided to customer service system 250.

Process 300 may further include determining that the telephone number has expired and providing an expiration indication (block 355). In some implementations, context profile server 230 may determine that the telephone number has expired when one or more criteria have been met. For example, context profile server 230 may determine that the telephone number has expired once the telephone number has been used to contact the customer service provider (e.g., based on receiving the call indication). As another example, context profile server 230 may determine that the telephone number has expired when a particular time has elapsed after the telephone number has been provided to user device 210.

As another example, context profile server 230 may determine that the telephone number has expired when the application activity indicates that the user may no longer be interested in contacting the customer service provider using the telephone number. For example, context profile server 230 may determine (e.g., based on application activity received after the telephone number has been provided to user device 210), that the user may no longer be interested in contacting the customer service provider using the telephone number when the user selects to contact the customer service provider via another technique (e.g., e-mail, online chat, etc.). Additionally, or alternatively, context profile server 230 may determine that the user may no longer be interested in contacting the customer service provider using the telephone number when the user accesses a resource (e.g., a knowledge-base, a technical help resource, etc.), and the accessing of that resource indicates that the user may no longer be interested in contacting the customer service provider. Additionally, or alternatively, context profile server 230 may determine that the user may no longer be interested in contacting the customer service provider using the telephone number when the user selects to perform a task via the application instead of performing the task via contacting the customer service provider (e.g., opening an account, placing an order, etc.).

Once context profile server 230 determines that the telephone number has expired, context profile server 230 may provide an indication of the expiration to number repository server 240. Number repository server 240 may then update information to identify that the telephone number no longer in use.

Figure 4:
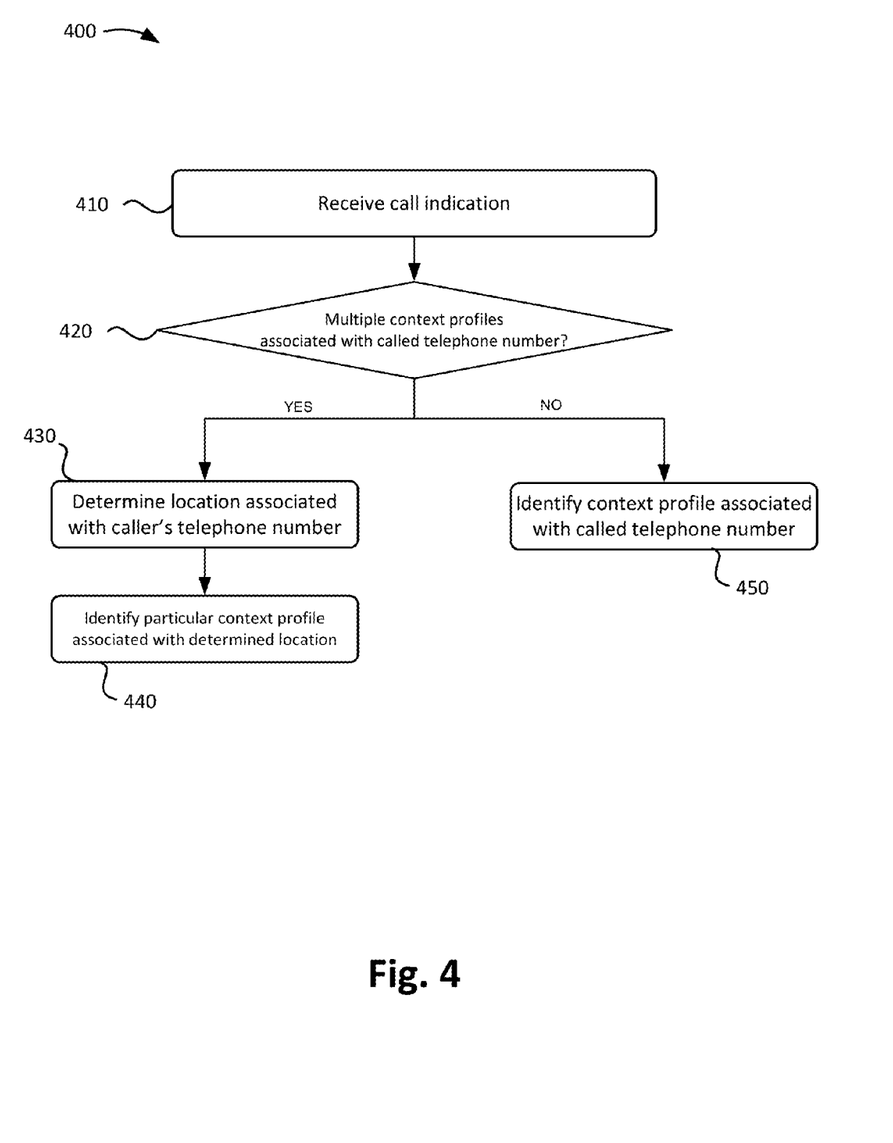
FIG. 4 illustrates a flowchart of an example process for identifying a particular context profile.

FIG. 4 illustrates a flowchart of an example process 400 for identifying a particular context profile. In some implementations, process 400 may be performed by context profile server 230. In some implementations, some or all of blocks of process 400 may be performed by one or more other devices. In some implementations, process 400 may correspond to operations associated with process block 340 described above with respect to FIG. 3.

As shown in FIG. 4, process 400 may include receiving a call indication (block 410). For example, as described above, context profile server 230 may receive the call indication when the user places a telephone call to a customer service provider. The call indication may identify the caller's telephone number (e.g., the user's telephone number) and may also identify the called telephone number (e.g., the telephone number associated with the customer service provider).

Process 400 may also include determining whether multiple context profiles are associated with the called telephone number (block 420). For example, context profile server 230 may look up the called telephone number in a data structure that identifies context profiles associated with the called telephone number.

If context profile server 230 determines that multiple context profiles are associated with the called telephone number (block 420-YES), process 400 may further include determining the location associated with the caller's telephone number (block 430). For example, context profile server 230 may determine the location associated with the caller's telephone number based on an area code associated with the caller's phone number. Additionally, or alternatively, context profile server 230 may determine the location associated with the caller's telephone number based on a directory.

Process 400 may also include identifying the particular context profile associated with the determined location (block 440). For example, context profile server 230 may identify the particular context profile associated with the determined location. As such, the context profile server 230 may identify the particular context profile based on both the user's location (e.g., the location associated with the user's telephone number) and the called telephone number (e.g., the telephone number assigned to the particular context profile). Once the particular context profile has been determined, context profile server 230 may update the particular context profile (e.g., with voice portal information). Additionally, or alternatively, context profile server 230 may provide the particular context profile to customer service system 250.

If, on the other hand, context profile server 230 determines that multiple context profiles are not associated with the called telephone number, process 400 may further include identifying the context profile associated with the called telephone number (block 450). For example, context profile server 230 may identify the context profile associated with the called telephone number, update the context profile, and provide the context profile to customer service system 250.

Figure 5:
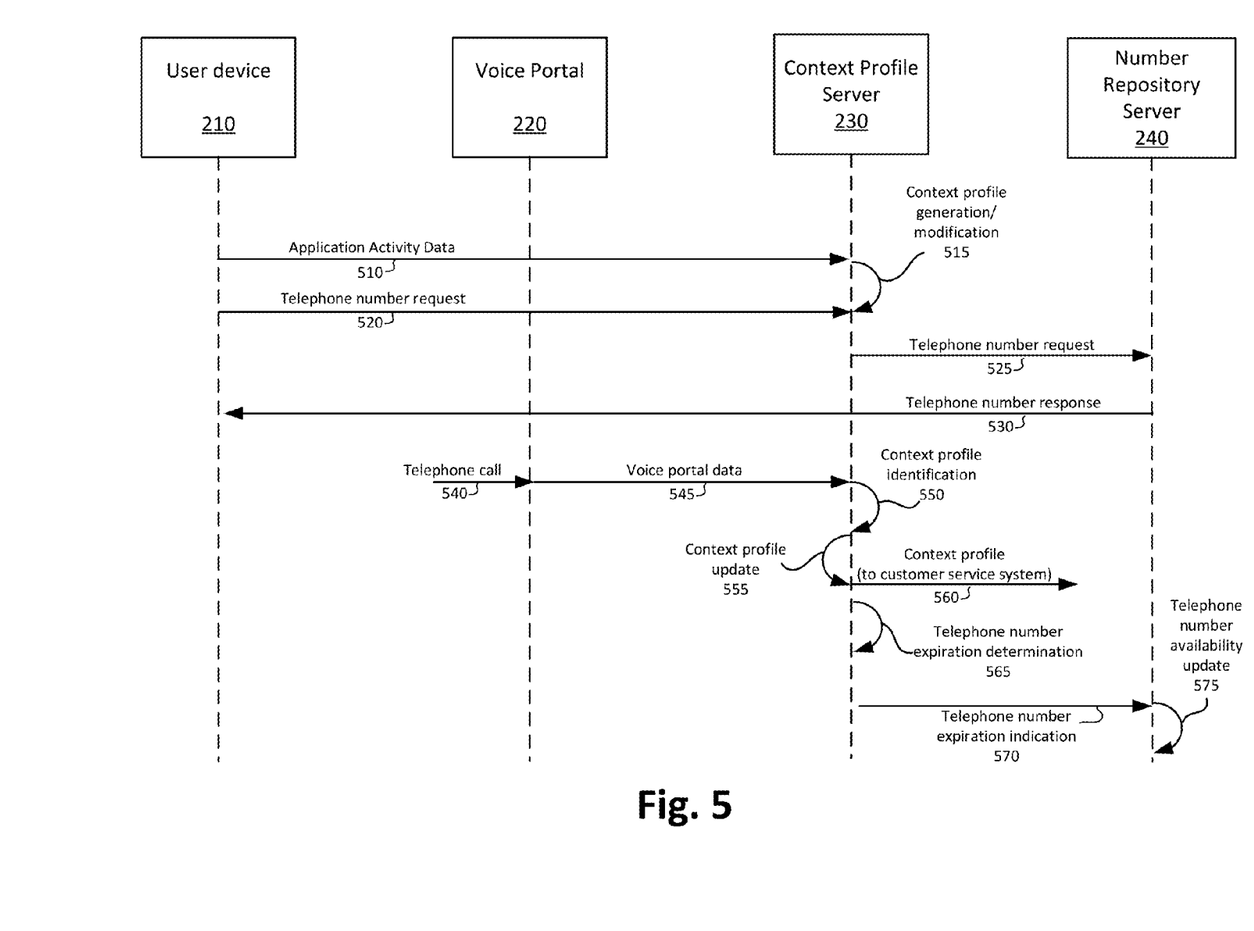
FIG. 5 illustrates a signal flow diagram of example operations for providing a context profile to a customer service system.

FIG. 5 illustrates a signal flow diagram of example operations for providing a context profile to a customer service system. As shown in FIG. 5, user device 210 may provide application activity data (at 510), for example, as a user interacts with an application and/or group of pages associated with a customer service provider. Context profile server 230 may generate a context profile (or modify an existing context profile) for the user based on receiving the application activity data (at 515).

User device 210 may provide a telephone number request when the user requests the telephone number in order to contact the customer service provider. In some implementations, the user may request the telephone number via a page and/or an application that may present an option for the user to request the telephone number. For example, the page and/or application may present a button that, when selected by the user, may cause user device 210 to provide the telephone number request. Context profile server 230 may provide the telephone number request to number repository server 240 (at 525), and number repository server 240 may provide a telephone number response (at 530) to user device 210, for example, via context profile server 230. Context profile server 230 may associate the telephone number with the context profile. Voice portal system 220 may receive a telephone call from a user that dialed the telephone number associated with the telephone number response (at 540) (e.g., from user device 210 or another device). Voice portal system 220 may form voice portal data based on information received from the user via the telephone call. Voice portal system 220 may provide the voice portal data (at 545) to context profile server 230. Voice portal system 220 may also forward the telephone call to customer service system 250 so that an operator of customer service system 250 may assist the user via the telephone call.

Context profile server 230 may identify the context profile associated with the telephone number associated with the voice portal data (at 550), and update the context profile to include information corresponding to the voice portal data (at 555). As described above, if context profile server 230 identifies multiple context profiles associated with the telephone number, context profile server 230 may identify a particular context profile based on a location associated with the context profile and a location associated with the caller's telephone number identified by the voice portal data. Context profile server 230 may then provide the particular context profile to customer service system 250 (at 560) so that the operator of customer service system 250 may receive the context profile when assisting the user.

Context profile server 230 may determine that the telephone number has expired (at 565) based on receiving the voice portal data indicating that the telephone number has been used by the user to contact the customer service provider. Context profile server 230 may provide a telephone number expiration indication (at 570) to number repository server 240, and number repository server 240 may then update information that indicates that the telephone number is available for use (at 575).

Figure 6:
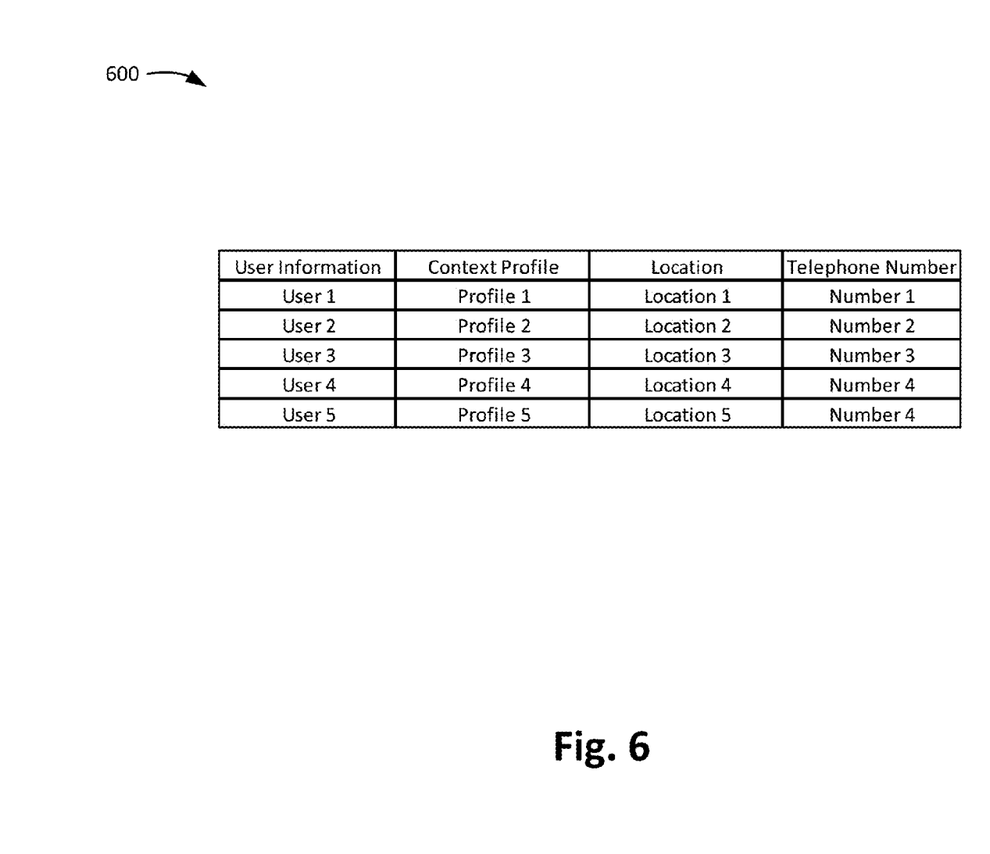
FIG. 6 illustrates an example data structure that may store context profiles and associated telephone numbers.

FIG. 6 illustrates an example data structure 600 that may store context profiles and associated telephone numbers. In some implementations, data structure 600 may be stored in a memory of context profile server 230. In some implementations, data structure 600 may be stored in a memory separate from, but accessible by, context profile server 230 (e.g., a "cloud" storage device). In some implementations, data structure 600 may be stored by some other device in environment 200, such as user device 210, voice portal system 220, number repository server 240, and/or customer service system 250. A particular instance of data structure 600 may contain different information and/or fields than another instance of data structure 600.

Each entry in data structure 600 may store information identifying a user, information associated with a context profile of the user (e.g., the user's context profile and/or a link to the user's context profile), a location associated with the context profile, and/or a telephone number associated with the context profile. Information in each context profile may be used to display (e.g., in a graphical user interface) the user's application activity data, such as the user's inputs (e.g., the user's interactions with a page and/or application). Information stored by data structure 600 may be used to identify a context profile associated with a telephone number.

As described above, location information, in addition to the telephone number, may be used to identify a context profile when multiple context profiles are associated with a single telephone number. For example, as shown in FIG. 6, telephone number 4 may be associated with two context profiles (e.g., profile 4 and profile 5). Profile 4 may be identified when telephone number 4 is called and when the caller's telephone number corresponds to location 4. Profile 5 may be identified when telephone number 4 is called and when the caller's telephone number corresponds to location 5.

While particular fields are shown in a particular format in data structure 600, in practice, data structure 600 may include additional fields, fewer fields, different fields, or differently arranged fields than are shown in FIG. 6. Also, FIG. 6 illustrates examples of information stored by data structure 600. In practice, other examples of information stored by data structure 600 are possible.

Figure 7:
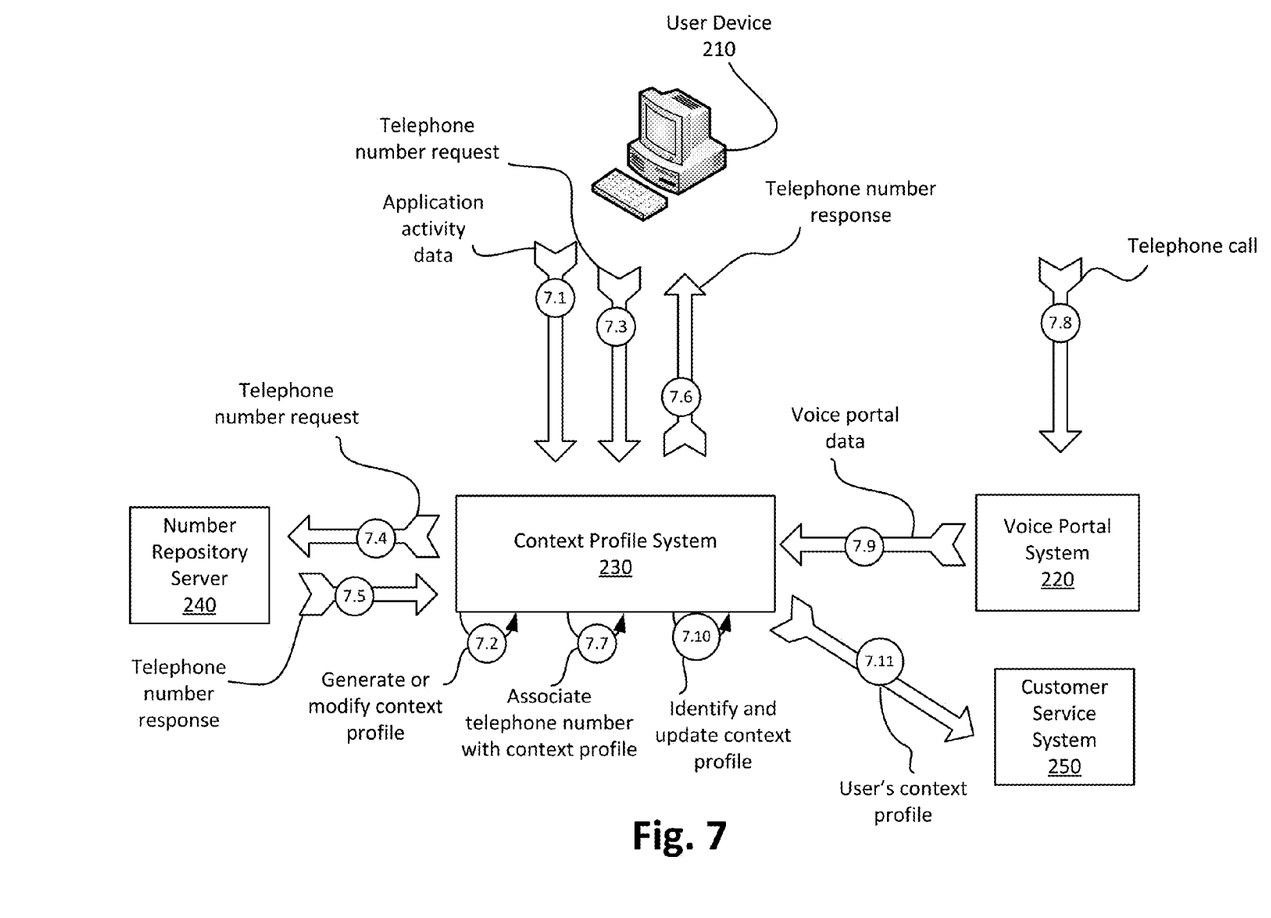
FIG. 7 illustrates an example implementation for providing a user's context profile to a customer service system.

FIG. 7 illustrates an example implementation for providing a user's context profile to a customer service system. As shown in FIG. 7, user device 210 may provide application activity data (at arrow 7.1), for example, as a user interacts with an application and/or group of pages associated with a customer service provider. Context profile server 230 may generate a context profile (or modify an existing context profile) for the user based on receiving the application activity data (at arrow 7.2).

User device 210 may provide a telephone number request when the user requests the telephone number in order to contact the customer service provider (arrow 7.3). Context profile server 230 may provide the telephone number request to number repository server 240 (arrow 7.4), and number repository server 240 may provide a telephone number response (arrow 7.5) to user device 210, for example, via context profile server 230 (arrow 7.6). Context profile server 230 may associate the telephone number with the context profile (arrow 7.7). Voice portal system 220 may receive a telephone call from a user that dialed the telephone number associated with the telephone number response (arrow 7.8). Voice portal system 220 may form voice portal data based on information received from the user via the telephone call. Voice portal system 220 may provide the voice portal data (arrow 7.9) to context profile server 230. Voice portal system 220 may also forward the telephone call to customer service system 250 so that an operator of customer service system 250 may assist the user via the telephone call.

Context profile server 230 may identify the context profile associated with the called telephone number and the location associated with the caller's telephone number. Context profile server 230 may update the context profile to include information corresponding to the voice portal data (arrow 7.10). Context profile server 230 may then provide the particular context profile to customer service system 250 (arrow 11) so that the operator of customer service system 250 may receive the context profile when assisting the user.

While a particular example is shown in FIG. 7, the above description is merely an example implementation. In practice, other examples are possible from what is described above in FIG. 7.

While the systems and/or methods are described in terms of associating a telephone number with a context profile, the systems and/or methods are not so limited. For example, in some implementations, a code and/or some other type of identifier may be associated with a context profile in addition to, or in lieu of, a telephone number. Also, in some implementations, a user's context profile may be received by the customer service provider when the user contacts the customer service provider by telephone, online chat, and/or via some other technique.

Figure 8:
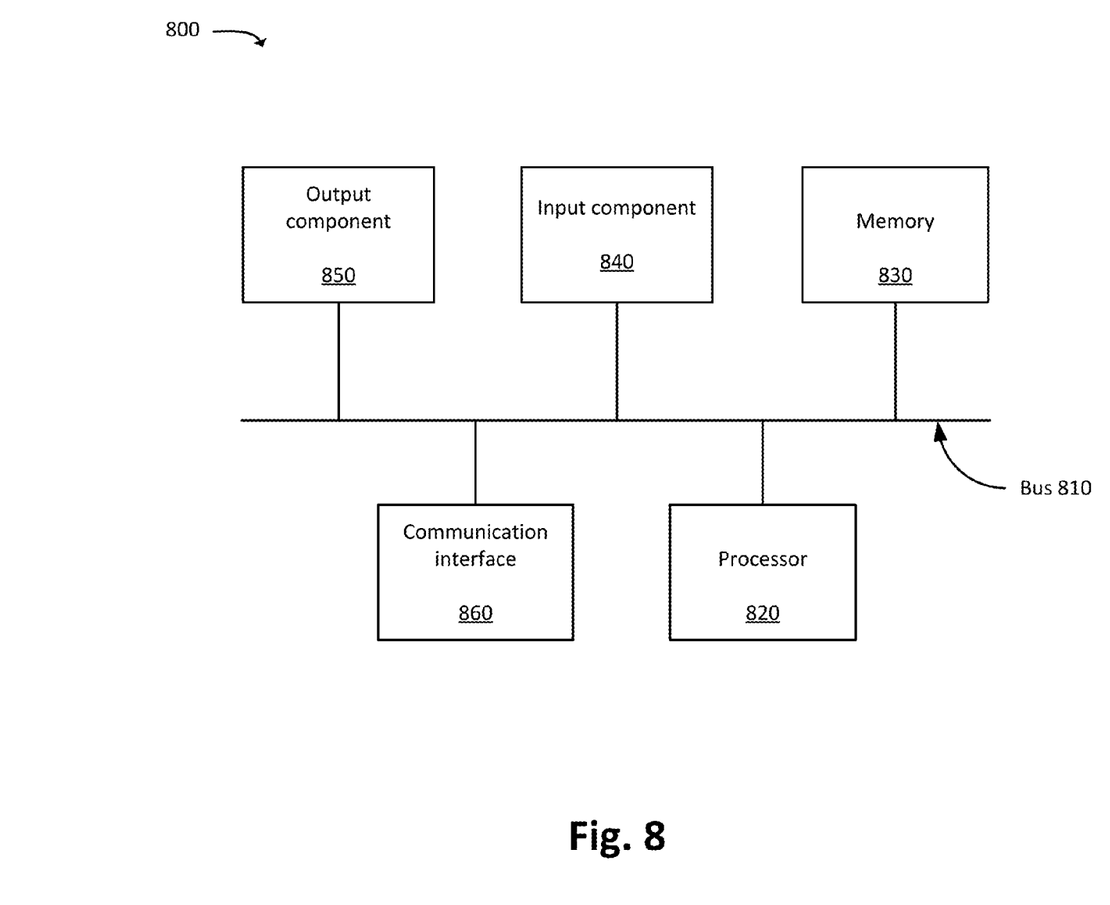
FIG. 8 illustrates example components of one or more devices, according to one or more implementations described herein.

FIG. 8 is a diagram of example components of device 800. One or more of the devices described above (e.g., with respect to FIGS. 1, 2, 5, and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signal flows have been described with regard to FIGS. 3-5, the order of the blocks and/or signal flows may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving, by a server device and from a user device, application activity data associated with the user device;
determining, by the server device and based on the application activity data, a location associated with the user device;
storing, by the server device, information associating the application activity data with a call identifier and the location;
receiving, by the server device, an indication that an incoming call has been received, the incoming call being placed using the call identifier;
determining, by the server device and based on receiving the indication, a location of a caller that placed the call;
identifying, by the server device, the application activity data based on the call identifier and the location of the caller; and
outputting, by the server device, the application activity data to a callee associated with the call.

2. The method of claim 1, wherein determining the location associated with the user device includes receiving information regarding an internet protocol (IP) address associated with the user device when receiving the application activity data.

3. The method of claim 1, further comprising:
receiving voice portal data when the incoming call is placed,
wherein receiving the indication includes receiving the indication as part of the voice portal data.

4. The method of claim 1, further comprising:
receiving voice portal data when the incoming call is placed; and
associating the voice portal data with the application activity data based on identifying the application activity data and receiving the voice portal data,
wherein outputting the application activity data includes outputting the voice portal data.

5. The method of claim 1, wherein the call identifier includes a telephone number.

6. The method of claim 1, wherein determining the location of the caller is based on an area code of a telephone number associated with the caller.

7. The method of claim 1, further comprising:
determining that the call identifier has expired; and
storing or outputting information identifying that call identifier is available based on determining that the call identifier has expired.

8. The method of claim 7, wherein determining that the call identifier has expired includes at least one of:
receiving the indication, or
determining that the caller is no longer interested in placing the incoming call based on the application activity data.

9. A system comprising:
a server device, comprising:
a non-transitory memory device storing:
a plurality of processor-executable instructions; and
a processor configured to execute the processor-executable instructions, wherein executing the processor-executable instructions causes the processor to:
receive, from a user device, application activity data associated with the user device;
determine, based on the application activity data, a location associated with the user device;
store information associating the application activity data with a call identifier and the location;
receive an indication that an incoming call has been received, the incoming call being placed using the call identifier;
determine, based on receiving the indication, a location of a caller that placed the call;
identify the application activity data based on the call identifier and the location of the caller; and
output the application activity data to a callee associated with the call.

10. The system of claim 9, wherein executing the processor-executable instructions, to determine the location associated with the user device, further causes the processor to receive information regarding an internet protocol (IP) address associated with the user device when receiving the application activity data.

11. The system of claim 9, wherein executing the processor-executable instructions further causes the processor to:
receive voice portal data when the incoming call is placed,
wherein receiving the indication includes receiving the indication as part of the voice portal data.

12. The system of claim 9, wherein executing the processor-executable instructions further causes the processor to:
receiving voice portal data when the incoming call is placed; and
associating the voice portal data with the application activity data based on identifying the application activity data and receiving the voice portal data
wherein executing the processor-executable instructions, to output the application activity data, causes the processor to output the voice portal data.

13. The system of claim 9, wherein the call identifier includes a telephone number.

14. The system of claim 9, wherein executing the processor-executable instructions, to determine the location of the caller, causes the processor to determine the location of the caller based on an area code of a telephone number associated with the caller.

15. The system of claim 9, wherein executing the processor-executable instructions further causes the processor to:
determine that the call identifier has expired; and
store or output information identifying that call identifier is available based on determining that the call identifier has expired.

16. The system of claim 15, wherein executing the processor-executable instructions, to determine that the call identifier has expired, causes the processor to determine that the call identifier has expired based on receiving the indication, or
determine that the caller is no longer interested in placing the incoming call based on the application activity data.

17. A method comprising:
storing, by the server device, a plurality of context profiles, each of the plurality of context profiles including application activity data and being associated with a particular user, a particular location, and a particular identifier,
receiving, by the server device, an identifier and information identifying a location when a user contacts the customer service provider;
determining, by the server device, whether more than one context profiles, of the plurality of context profiles, are associated with the identifier;
identifying, by the server device, a particular context profile based on the identifier and the information identifying the location based on determining that more than one context profiles are associated with the identifier; and
outputting, by the server device, the particular context profile.

18. The method of claim 17, wherein the identifier includes a telephone number.

19. The method of claim 17, wherein the information identifying the location information includes an area code included in the identifier.

20. The method of claim 17, wherein the particular location is based on an internet protocol (IP) address of a user device associated with the application activity data.

* * * * *